United States Patent [19]

Wystrach

[11] 3,770,514

[45] Nov. 6, 1973

[54] CHEMICAL TREATMENT OF METAL
[75] Inventor: Vernon Paul Wystrach, Wilton, Conn.
[73] Assignee: American Cyanamid Company, Stamford, Conn.
[22] Filed: June 8, 1972
[21] Appl. No.: 260,954

[52] U.S. Cl............ 148/6.15 R, 148/6.27, 148/31.5, 106/14, 252/389
[51] Int. Cl. .............................................. C23f 7/08
[58] Field of Search...................... 148/6.15 R, 6.27, 148/31.5; 106/14; 252/389 A; 21/2.7, 2.5

[56] References Cited
UNITED STATES PATENTS
3,622,401   11/1971   McCullough et al. ......... 148/6.15 R Primary Examiner—Ralph S. Kendall
Attorney—Frank M. Van Riet

[57] ABSTRACT

A method for preparing metal surfaces for receipt of a coating such as a paint or adhesive whereby increased coating adhesion and corrosion resistance is achieved and the treated metal per se, are disclosed. The method comprises contacting the metal surface with various diphosphine oxides.

10 Claims, No Drawings

CHEMICAL TREATMENT OF METAL

BACKGROUND OF THE INVENTION

The use of various chemical materials in the treatment of metal surfaces is well known to those skilled in the art. For example, U.S. Pat. No. 3,615,888 describes a method wherein various diketones are utilized in the surface treatment of metal, whereas U.S. Pat. No. 3,615,889 discloses the use of various quinolines for the same purpose. Phosphinyl derivatives are set forth in U.S. Pat. No. 3,615,894 and phosphinic and phosphonic acids are mentioned as useful in U.S. Pat. No. 3,624,146.

Another patent which discloses a method even more closely related to that of the instant invention is U.S. Pat. No. 3,622,401 wherein various hydroxypropyl phosphine oxide derivatives are shown.

SUMMARY

I have now found that the adhesion of coatings to metals can be materially increased or strengthened by treating the metal with a chemical material which is either chemically reacted with the metal or absorbed thereby via strong bonds. As set forth in the above-disclosed patents, a foundation or integral chemical or chemically bonded coating is formed on the metal surface, which foundation is then more susceptible to an ultimate or surface coating applied thereto, such as a paint or adhesive. My method results in coatings which are securely bonded or adhered to the foundation layer because the foundation is chemically bonded to the metal and any ultimate coating is chemically bonded to the foundation. That is to say, upon treating the metal surface according to my novel method, a reaction causes a strong bonding of the diphosphine oxide derivative to the metal, the diphosphine oxide derivative having available a free group which is capable of reacting with an exterior surface coating. This free reactive group chemically combines with the coating to produce an article of manufacture having a tightly bonded coating thereon. Additionally, the corrosion resistance of metals treated according to the present invention is at least as effective as, and in many cases, better than commercially available corrosion resistant systems.

DESCRIPTION OF THE INVENTION INCLUDING PREFERRED EMBODIMENTS

My novel process comprises treating a metal surface, such as that of aluminum, steel, carbon steel, iron, titanium, and the like with the diphosphine oxide derivative having the formula

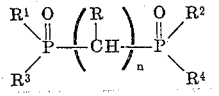

wherein n is an integer from 1 to 4 inclusive, R is hydrogen or a hydroxy radical, and $R^1$, $R^2$, $R^3$ and $R^4$ are, individually, hydroxy, amino, hydroxyalkyl, hydroxyaryl, aminoaryloxy, vinylaralkyl, hydroxyalkoxy or epoxyalkoxy radicals. Preferably, $R^1$ and $R^2$ are the same and $R^3$ and $R^4$ are the same. Even more preferably, $R^1$, $R^2$, $R^3$ and $R^4$ are identical.

While not wishing to be bound by any particular theory, I believe that the P=O groups and any OH groups of the diphosphine oxide derivative react with the oxide layer formed on the surface of the metal to be treated. The existence of such oxide layers is well recognized by cogent workers in the art. Such layers form upon exposure of the metal to the atmosphere. After the diphosphine oxide derivative-metal oxide bonding is complete, the other available reactive groups of the diphosphine oxide foundation layer are then free to react with the available groups of the surface coating, i.e., paint, adhesive etc. applied thereto, thereby chemically bonding the coating to the metal. The diphosphine oxide derivative-metal oxide bonding is pseudo-chemical in nature and can be more accurately described as a chemisorption or chelation of the derivative by the metal.

The diphosphine oxide derivative foundation layer may be applied to the metal surface, the metal first being thoroughly cleaned such as by degreasing with trichloroethylene etc. or other common techniques, by immersing, dipping, painting, brushing, wiping, spraying etc. the metal to be treated with solutions of one or more of said diphosphine oxide derivatives, for a length of time such that the metal surface absorbs or reacts with a sufficient amount of the derivative. The metal is then merely removed from the solution and allowed to dry.

Additionally, the diphosphine oxide derivative can be applied to the metal by first incorporating it into the surface coating material, e.g., the paint or adhesive, and then applying the surface coating. In this manner, the diphosphine oxide derivative can be added, for example, to the paint vehicle, and the paint then can be sprayed etc. onto the metal. Similarly, the diphosphine oxide derivative can be added to one part of a two-part adhesive system and the adhesive can then be applied to the metal. In each instance, the reactive groups of the surface coating material will react with the appropriate groups of the diphosphine oxide derivative while the derivative itself reacts with the oxide on the metal surface, as more specifically described above. The solution of the diphosphine oxide derivative can comprise from about 1 part to about 50 parts of the derivative per 1,000 parts of solvent, e.g., ethanol, methanol, water, etc. The treatment is preferably conducted at room temperature although higher or lower temperatures may be utilized, if desired. Complete chemisorption of the diphosphine oxide derivative onto the metal surface is generally achieved in from about 10 to about 20 minutes, the lower the derivative concentration, the longer the reaction time necessary.

As mentioned above, because a group reactive with the surface coating or layer is present on the diphosphine oxide derivative, there is afforded a chemically available site whereby the reactive group of a paint or adhesive layer may chemically react to thereby form a tightly adhering coating or layer. Examples of paints, adhesives or other coatings which may be used include epoxy paints and adhesives, i.e., those containing chemically available

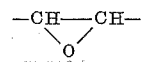

groups; urethane paints and adhesives, i.e., those containing chemically available NCO groups; acrylic paints and adhesives, i.e., those containing chemically available

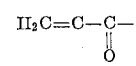

groups; vinyl paints and adhesives, i.e., those containing chemically available -CH=CH- groups and the like. As is clear from the enumeration of the chemically available groups of the above-mentioned coatings, the available group may be free to react with the available group of the diphosphine oxide derivative layer previously applied to the metal surface. These reactive groups are explicitly represented, as discussed above, by amino, OH, epoxy and unsaturated aliphatic groups and in the case of epoxy and urethane paints and adhesives would be amino, -OH or epoxy substituted groups, while in the case of acrylic or vinyl paints and adhesives, the reactive group of the diphosphine oxide derivative would be the unsaturated substituent, including vinyl, allyl etc.

The coating, e.g., a paint, can be applied in a condition such that the reaction occurs while the paint vehicle evaporates or in a condition such that the paint must more completely polymerize or cure before it forms a useful coating. In the latter case, if a functional group of the diphosphine oxide derivative is such that it initiates polymerization of the paint, the paint may be applied in a prepolymer or semipolymer condition. An example of such a treatment is illustrated by the use of an hydroxy group containing derivative and an epoxy prepolymer. In this case, the hydroxy group both reacts with and cures (polymerizes) the epoxy prepolymer.

Additionally, I have found that my novel processing procedure can be utilized in conjunction with known procedures to obtain a pseudosynergistic effect. For example, I can improve the corrosion resistance of metals treated according to my invention by first treating the metal with an inorganic chromate in a manner known in the art. Furthermore, the chromate (e.g., potassium dichromate; chromic acid solution, etc.) may be incorporated into the solution of the diphosphine oxide derivative before treating the metal according to my invention. In this manner, the corrosion resistance of the metal is further increased without loss of the enhanced surface coating aderence mentioned above.

The diphosphine oxide derivatives utilized in the present invention are known to those skilled in the art as are methods for the production. Generally, they may be produced according to procedures set forth in Kosolapoff; Oganophosphorus Compounds; J. Wiley and Sons; pgs. 10–165; 1950. Additionally, Nylen, Dissertation; Upsola, 1930 shows production of such compounds wherein $R^1$-$R^4$ are hydroxy radicals. Kabachnik et al., Izvest. Akad. Nauk SSSR, 1947, page 631; Saunders et al., J. Chem. Soc. 1948, page 699; Nicholson et al. I. Org. Chem. Vol. 35, page 3149, 1970 and Richard et al. J. Am. Chem. Soc. Vol. 83, page 1722, 1961 also illustrate additional methods which may be employed in the production of various diphosphine oxides useful herein. Additional derivatives which may be utilized in the instant procedure are prepared as set forth in U.S. Pat. No. 2,856,369 which reference, and those specified above, are hereby incorporated herein.

The pre-treating process and products of the instant invention find utility in military, industrial and consumer fields such as aircraft and ship surfaces, cooling towers, heat exchangers, window screens, siding and the like.

The following examples are set forth for purposes of illustration only and are not meant to be construed as limitations on the present invention except as set forth in the appended claims. All parts and percentages are by weight unless otherwise specified.

Example 1

Aluminum panels, 3 × 5 inch, are degreased by dipping in benzene and further cleaned by dipping in a hot 10 percent solution of a commercially available aluminum cleaner. The panels are then allowed to dry in air. One panel is then immersed in a solution of methylene-bis[bis(hydroxymethyl) phosphin oxide] in ethanol. After 15 minutes the panel is removed and allowed to dry.

The panel is then spray painted with a commercially available epoxy paint and allowed to dry and cure for 5 days at room temperature.

The painted panel is then subjected to a modified version of the "Cross-Hatch Tape Test" formulated by the National Coil Coaters Association. In the test, the painted surface is cut 10 times vertically and 10 times horizontally with a razor blade, the scratch lines being approximately 5 mm. apart. Scotch cellophane tape No. 600 is applied over the test area and rubbed with sufficient pressure to remove all air bubbles. The panel is allowed to set for 10 minutes and the tape is then removed sharply with a pull at right angles to the test surface. A visual examination allows a reasonably accurate estimation of the percent finish remaining on the panel in the test area.

The above-treated panel showed substantially superior adhesion in comparison with a control panel which was not pre-treated with diphosphine oxide before coating.

The average results of tests conducted on panels treated according to Example 1, in addition to the results recorded utilizing different diphosphine oxide derivatives according to the process of the present invention, are set forth in Table I, below.

TABLE I

| Example | R | $R^1$ | $R^2$ | $R^3$ | $R^4$ | n | Results of cellophane tape test |
|---|---|---|---|---|---|---|---|
| Control* | | | | | | | Failed.[1] |
| 1 | H | $CH_2OH$ | $CH_2OH$ | $CH_2OH$ | $CH_2OH$ | 1 | Passed. |
| 2 | OH | 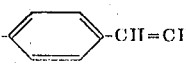-CH=$CH_2$ | 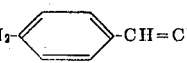-CH=$CH_2$ | $OCH_2CH_2OH$ | $OCH_2CH_2OH$ | 2 | Do. |
| 3 | H | $OCH_2CH-CH_2$ with O bridge | $OCH_2CH-CH_2$ with O bridge | 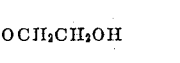-$NH_2$ | 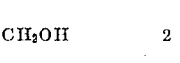-$NH_2$ | 1 | Do. |
| 4 | H | $NH_2$ | $CH_2OH$ | -OH | OH | 1 | Do. |

TABLE I.—Continued

| | | Diphosphine oxide derivative | | | | | Results of cellophane |
|---|---|---|---|---|---|---|---|
| Example | R | R¹ | R² | R³ | R⁴ | n | tape test |
| 5 | H | OH | OH | OH | OH | 1 | Do. |
| 6 | OH | C₄H₉OH | C₄H₉OH | C₄H₉OH | C₄H₉OH | 2 | Do. |
| 7 | H | OH | OH | —⟨◯⟩—OH | —⟨◯⟩—OH | 4 | Do. |
| 8 | H | O—⟨◯⟩—NH₂ | O—⟨◯⟩—NH₂ | O—⟨◯⟩—NH₂ | O—⟨◯⟩—NH₂ | 1 | Do. |
| 9 | H | NH₂ | NH₂ | NH₂ | NH₂ | 1 | Do. |
| 10 | H | OCH₂CH—CH₂\\O/ | OCH₂CH—CH₂\\O/ | OCH₂CH₂CH₂OH | OCH₂CH₂CH₂OH | 3 | Do. |

\* No diphosphine oxide used.
\*\* Acrylic paint used.
¹ = more than 50% of paint removed.
² = more than 75% of paint retained.

I claim:

1. A method which comprises treating a metal surface with a compound having the formula

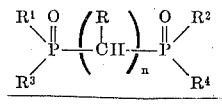

wherein n is an integer from 1 to 4 inclusive, R is hydrogen or a hydroxy radical, and R¹, R², R³ and R⁴ are, individually, hydroxy, amino, hydroxyalkyl, hydroxyaryl, aminoaryloxy, vinylaralkyl, hydroxyalkoxy or epoxyalkoxy radicals.

2. An article of manufacture comprising a metal surface having coated thereon a compound having the formula set forth in claim 1.

3. A method according to claim 1 wherein the metal surface is treated with said compound and a surface coating chemically reactive with said compound is coated thereon.

4. A method according to claim 1 wherein said compound is added as a mixture with a surface coating reactive with said compound.

5. A method according to claim 1 wherein said compound is methylenebis[bis(hydroxymethyl) phosphine oxide].

6. A method according to claim 1 wherein said metal is aluminum.

7. A method according to claim 3 wherein said surface coating is a paint.

8. A method according to claim 4 wherein said surface coating is paint.

9. A method according to claim 3 wherein said surface coating is an adhesive.

10. An article according to claim 2 wherein said metal is aluminum.

\* \* \* \* \*